United States Patent
Konno et al.

(10) Patent No.: US 8,681,833 B2
(45) Date of Patent: Mar. 25, 2014

(54) COMMUNICATION SYSTEM, TRANSMITTER, RECEIVER AND COMMUNICATION METHOD

(75) Inventors: Yoshio Konno, Osaka (JP); Toshiaki Kameno, Osaka (JP); Katsutoshi Ishikura, Osaka (JP); Kouichi Tsunekawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 648 days.

(21) Appl. No.: 12/988,733

(22) PCT Filed: Apr. 22, 2009

(86) PCT No.: PCT/JP2009/057980
§ 371 (c)(1),
(2), (4) Date: Oct. 20, 2010

(87) PCT Pub. No.: WO2009/131142
PCT Pub. Date: Oct. 29, 2009

(65) Prior Publication Data
US 2011/0038398 A1  Feb. 17, 2011

(30) Foreign Application Priority Data
Apr. 23, 2008  (JP) ................................. 2008-112605

(51) Int. Cl.
*H04B 1/00*  (2006.01)
(52) U.S. Cl.
USPC ........................................................ 375/133
(58) Field of Classification Search
USPC ................. 375/132, 133, 135, 138, 259, 267; 370/208, 210, 329, 330, 468
See application file for complete search history.

(56) References Cited

U.S. PATENT DOCUMENTS

| | | | |
|---|---|---|---|
| 2006/0013285 A1* | 1/2006 | Kobayashi et al. | 375/132 |
| 2007/0263743 A1* | 11/2007 | Lee et al. | 375/267 |
| 2011/0235685 A1* | 9/2011 | Sutivong et al. | 375/135 |

OTHER PUBLICATIONS

3GPP TS 36.211 V8.0.0 (Sep. 2007), Technical Specification, "3rd Generation Partnership Project; Technical Specification Group Radio Access Network; Evolved Universal Terrestrial Radio Access (E-UTRA); Physical channels and modulation (Release 8)", pp. 1-50.
3GPP TSG RAN WG1 #48bis R1-071759, "Complexity and performance of channel-estimation with hopping RS", Marvell Semiconductors, Malta, Mar. 26-30 2007, pp. 1-5.

(Continued)

*Primary Examiner* — Sam K Ahn
*Assistant Examiner* — Syed Haider
(74) *Attorney, Agent, or Firm* — Birch, Stewart, Kolasch & Birch, LLP

(57) ABSTRACT

A transmitter communicating with a receiver, the transmitter including: a first hopping sequence generation unit which generates a hopping sequence whose hopping subcarrier interval is less than or equal to a predetermined threshold value based on a cell ID; a first reference signal pattern generation unit which generates a reference signal pattern based on a reference signal basic pattern including a predetermined known signal sequence and the hopping sequence generated by the first hopping sequence generation unit; an arrangement unit which arranges the reference signal and a data symbol in a predetermined position within the symbol, based on the reference signal pattern generated by the first reference signal pattern generation unit; and a signal transmission unit which transmits the symbol having the reference signal and the data symbol arranged by the arrangement unit to the receiver.

10 Claims, 9 Drawing Sheets

(56) References Cited

OTHER PUBLICATIONS

3GPP TSG RAN WG1 Meeting #48 R1-070704, "Performance evaluation of RS hopping/shifting", Nortel, Feb. 12-16, 2007, St. Louis, USA, pp. 1-11.

3GPP TSG RAN WG1 Meeting #49 R1-072427, "Frequency Hopping/Shifting of Downlink Reference Signal in E-UTRA", NTT DoCoMo, Ericsson, Fujitsu, Mitsubishi Electric, Panasonic, Sharp, Toshiba Corporation, Kobe, Japan, May 7-11, 2007, (Original R1-071641), pp. 1-3.

3GPP TSG-RAN WG1 #49 R1-072027, "Details on hopping of DL RS", Qualcomm Europe, Kobe, Japan, May 7-11, 2007, pp. 1-3.

* cited by examiner

FIG. 7

| CELL ID | HOPPING SEQUENCE= [$hp_1$ $hp_2$ $hp_3$ $hp_4$ $hp_5$ $hp_6$ $hp_7$ $hp_8$ $hp_9$ $hp_{10}$] |
|---|---|
| 0001 | [+3 +1 −1 −1 0 +1 0 −1 −1 +1] |
| 0002 | [−1 0 +1 −1 −1 0 0 +1 −1 +1] |
| 0003 | [−2 +1 1 0 −1 +1 +1 −1 0 0] |
| ⋮ | ⋮ |

FIG. 10

| SEQUENCE | COMPLEXITY OF CHANNEL ESTIMATION | SEQUENCE NUMBER |
|---|---|---|
| HOPPING (NON-LIMIT) | 2 x 6 | $6^{10}$=60466176 |
| HOPPING (LIMIT OF THREE: -1, 0, 1) | 2 x 3 | $6 \times 3^9$=118098 |
| HOPPING (LIMIT OF TWO: -1, 1) | 2 x 2 | $6 \times 2^9$=3072 |
| SHIFTING | 2 x 1 | $6 \times 1^9$=6 |

COMMUNICATION SYSTEM, TRANSMITTER, RECEIVER AND COMMUNICATION METHOD

TECHNICAL FIELD

The present invention relates to a communication system, a transmitter, a receiver and a communication method.

This application claims priority to and the benefit of Japanese Patent Applications No. 2008-112605 filed on Apr. 23, 2008 the disclosure of which is incorporated herein by reference.

BACKGROUND ART

Recently, mobile communication schemes based on orthogonal frequency division multiplexing (OFDM) have been investigated. Mobile communication schemes based on a combination of OFDM and communication technology using another communication scheme have also been investigated. The other communication scheme may be, for example, code division multiplexing access (CDMA).

The next generation specification is being investigated as long term evolution (LTE) even in the 3rd Generation Partnership Project (3GPP) that performs standardization of mobile phones. Further, 3GPP employs OFDM as a downlink communication scheme.

In the downlink communication scheme that is being investigated as the LTE, a reference signal (RS) equivalent to a known symbol (also referred to as a pilot symbol) is transmitted from a transmitter to a receiver via each antenna. There are three reference signals (1) to (3) shown below.

(1) Cell-specific reference signals
(2) MBSFN reference signals
(3) UE-specific reference signals Non-Patent Document 1 discloses which of the reference signals (1) to (3) is arranged in which symbol. In addition, Non-Patent Documents 2 and 3 disclose associated technology.

Setting an arrangement of the cell-specific reference signals in each base station device, which is a transmitter, is under investigation. Arrangement of the cell-specific reference signals is disclosed in Non-Patent Document 1.

For arrangement of reference signals, there are two schemes: shifting and hopping.

In the shifting scheme, the reference signals are arranged by shifting an RS basic pattern in a frequency direction in a specific pattern corresponding to a cell ID unique to a cell. In the shifting scheme, the arrangement of the RS basic pattern is not changed in a time direction (subframe unit).

Meanwhile, in the hopping scheme, the reference signals are arranged by shifting an RS basic pattern in a frequency direction in a specific pattern corresponding to a cell ID unique to a cell. In the hopping scheme, the shift in the frequency direction according to the specific pattern corresponding to the cell ID specific to the cell is continuously performed even in a time direction.

In the related art, when hopping is performed with no limit, the complexity in channel estimation increases. Inversely, when shifting is performed, the complexity in the channel estimation is small, but the throughput characteristic is deteriorated. Further, when the RS arrangement disclosed in Non-Patent Document 2 is used, the precision of the channel estimation is deteriorated.

Therefore, in the related art, there are problems in that a channel estimation process in a receiver with respect to a signal transmitted from a transmitter becomes complicated, and the throughput in communication between the transmitter and the receiver is reduced.

Non-Patent Document 1: 3GPP TS 36.211 Technical Specification Group Radio Access Network; Physical Channels and Modulation V8.0.0
Non-Patent Document 2: Marvell Semiconductors, "Complexity and performance of channel estimation with hopping RS" (3GPP R1-071759)
Non-Patent Document 3: Qualcomm Europe, "Details on hopping of DL RS" (3GPP R1-072027)

DISCLOSURE OF INVENTION

Problem to be Solved by the Invention

The present invention has been achieved in view of the above circumstances, and it is an object of the present invention to provide a communication system, a transmitter, a receiver and a communication method, capable of preventing the throughput in communication between the transmitter and the receiver from being reduced.

Means for Solving the Problem (1) The present invention has been made to solve the above-described problem. According to an aspect of the present invention, there is provided a communication system including a transmitter and a receiver, wherein the transmitter includes: a first hopping sequence generation unit which generates a hopping sequence whose hopping subcarrier interval is less than or equal to a predetermined threshold value, based on a cell ID; a first reference signal pattern generation unit which generates a reference signal pattern, based on a reference signal basic pattern including a predetermined known signal sequence and the hopping sequence generated by the first hopping sequence generation unit; an arrangement unit which arranges the reference signal and a data symbol in a predetermined position within the symbol, based on the reference signal pattern generated by the first reference signal pattern generation unit; and a signal transmission unit which transmits the symbol having the reference signal and the data symbol arranged by the arrangement unit to the receiver, and the receiver includes: a signal reception unit which receives a signal transmitted from the transmitter; a second hopping sequence generation unit which generates a hopping sequence based on a cell ID included in the signal received by the signal reception unit; a second reference signal pattern generation unit which generates a reference signal pattern based on a reference signal basic pattern including a predetermined known signal sequence and the hopping sequence generated by the second hopping sequence generation unit; a separation unit which separates a reference symbol and a data symbol arranged in a predetermined position of the signal received by the signal receiver, based on the reference signal pattern generated by the second reference signal pattern generation unit; and a channel estimation unit which performs channel estimation in a range where the hopping subcarrier interval is less than or equal to the predetermined threshold value, based on the reference symbol separated by the separation unit.

(2) According to another aspect of the present invention, there is provided a transmitter communicating with a receiver, the transmitter including: a first hopping sequence generation unit which generates a hopping sequence whose hopping subcarrier interval is less than or equal to a predetermined threshold value based on a cell ID; a first reference signal pattern generation unit which generates a reference signal pattern based on a reference signal basic pattern including a predetermined known signal sequence and the hopping sequence generated by the first hopping sequence generation unit; an arrangement unit which arranges the reference signal and a data symbol in a predetermined position within the symbol, based on the reference signal pattern generated by the first reference signal pattern generation unit; and a signal transmission unit which transmits the symbol having the reference signal and the data symbol arranged by the arrangement unit to the receiver.

(3) According to the aspect of the present invention, the first hopping sequence generation unit may store the hopping sequence corresponding to each cell ID in advance and generates the hopping sequence corresponding to the cell ID.

(4) According to the aspect of the present invention, the first hopping sequence generation unit may generate the hopping sequences using a predetermined function.

(5) According to the aspect of the present invention, the first hopping sequence generation unit may store hopping sequences corresponding to cell IDs in advance, the correlation therebetween being smaller than a predetermined value.

(6) According to the aspect of the present invention, the first hopping sequence generation unit may generate a hopping sequence, the correlation therebetween being smaller than a predetermined value, corresponding to each cell ID based on the cell ID.

(7) According to the aspect of the present invention, the first hopping sequence generation unit may generate the hopping sequence corresponding to the cell IDs, the correlation therebetween being smaller than a predetermined value, using a predetermined function.

(8) According to the aspect of the present invention, the first hopping sequence generation unit may generate the hopping sequence using a random sequence.

(9) According to the aspect of the present invention, the first hopping sequence generation unit may generate the hopping sequence such that the hopping subcarrier interval is less than or equal to 1.

(10) According to still another aspect of the present invention, there is provided a receiver communicating with a transmitter, the receiver including: a signal reception unit which receives a signal transmitted from the transmitter; a second hopping sequence generation unit which generates a hopping sequence based on a cell ID included in the signal received by the signal receiver; a second reference signal pattern generation unit which generates a reference signal pattern based on a reference signal basic pattern including a predetermined known signal sequence and the hopping sequence generated by the second hopping sequence generation unit; a separation unit which separates a reference symbol and a data symbol arranged in a predetermined position of the signal received by the signal receiver based on the reference signal pattern generated by the second reference signal pattern generation unit; and a channel estimation unit which performs channel estimation in a range where a hopping subcarrier interval is less than or equal to a predetermined threshold value, based on the reference symbol separated by the separation unit.

(11) According to the aspect of the present invention, the channel estimation unit may perform channel estimation in a range where the hopping subcarrier interval is less than or equal to 1.

(12) According to still another aspect of the present invention, there is provided a communication method using a transmitter and a receiver, the communication method includes: generating, by the transmitter, a hopping sequence whose hopping subcarrier interval is less than or equal to a predetermined threshold value based on a cell ID; generating, by the transmitter, a reference signal pattern, based on a reference signal basic pattern including a predetermined known signal sequence and the hopping sequence generated in the generation of the hopping sequence by the transmitter; arranging, by the transmitter, the reference signal and a data symbol in a predetermined position within the symbol, based on the reference signal pattern generated in the generation of the reference signal pattern by the transmitter; and transmitting, by the transmitter, the symbol having the reference signal and data symbol arranged in the arrangement of the reference signal and the data symbol, to the receiver, and receiving, by the receiver, a signal transmitted from the transmitter; generating, by the receiver, a hopping sequence based on a cell ID included in the signal received in the reception of the signal; generating, by the receiver, a reference signal pattern based on a reference signal basic pattern including a predetermined known signal sequence and the hopping sequence generated in the generation of the hopping sequence by the receiver; separating, by the receiver, a reference symbol and a data symbol arranged in a predetermined position of the signal received in the reception of the signal, based on the reference signal pattern generated in the generation of the reference signal pattern by the receiver; and performing, by the receiver, channel estimation in a range where the hopping subcarrier interval is less than or equal to the predetermined threshold value, based on the reference symbol separated in the separation of the reference symbol and the data symbol.

Effect of the Invention

In a communication system, a transmitter, a receiver and a communication method, it is possible to simplify a process when the receiver performs channel estimation for a signal transmitted from the transmitter, and to prevent the throughput in communication between the transmitter and the receiver from being reduced.

BRIEF DESCRIPTION OF THE DRAWINGS

FIG. 7 is a diagram showing an example of a correspondence table indicating a correspondence between a cell ID and a hopping sequence according to the embodiment of the present invention.

FIG. 10 is a table in which complexity of channel estimation due to a difference between hopping methods and a hopping sequence number are summarized.

BEST MODE FOR CARRYING OUT THE INVENTION

Hereinafter, an embodiment of the present invention will be described with reference to the accompanying drawings.

Figure 1:
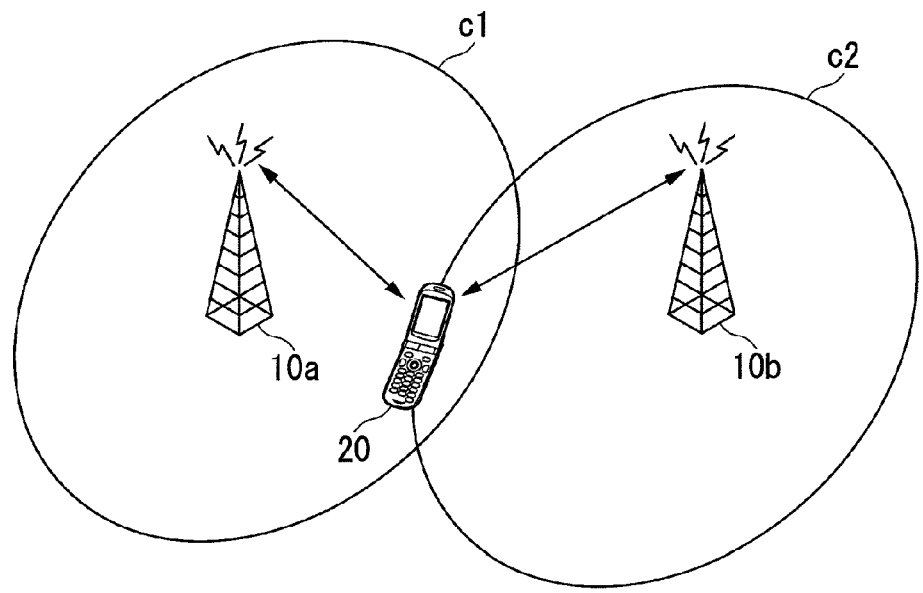
FIG. 1 is a schematic diagram showing a communication system 100 according to an embodiment of the present invention.

FIG. 1 is a schematic diagram of a communication system 100 according to the embodiment of the present invention. The communication system 100 uses OFDM technology. In FIG. 1, base station devices 10a and 10b and a terminal 20, which is a mobile phone, communicate with each other.

In FIG. 1, a cell c1 indicates an area in which the base station device 10a can communicate with the terminal 20. Further, a cell c2 indicates an area in which the base station device 10b can communicate with the terminal 20.

The terminal 20 simultaneously receives an inter-cell interference from the base station device 10b as well as the base station device 10a. In order to enhance the reception characteristic of the terminal 20 that receives such an inter-cell interference, the base station device 10a performs hopping of the RS and transmits a resultant RS to the terminal 20.

Hereinafter, as a hopping sequence of an RS, a hopping sequence that suppresses the complexity of channel estimation of the terminal 20 without reducing the throughput characteristic and precision of channel estimation will be described.

Figure 2:
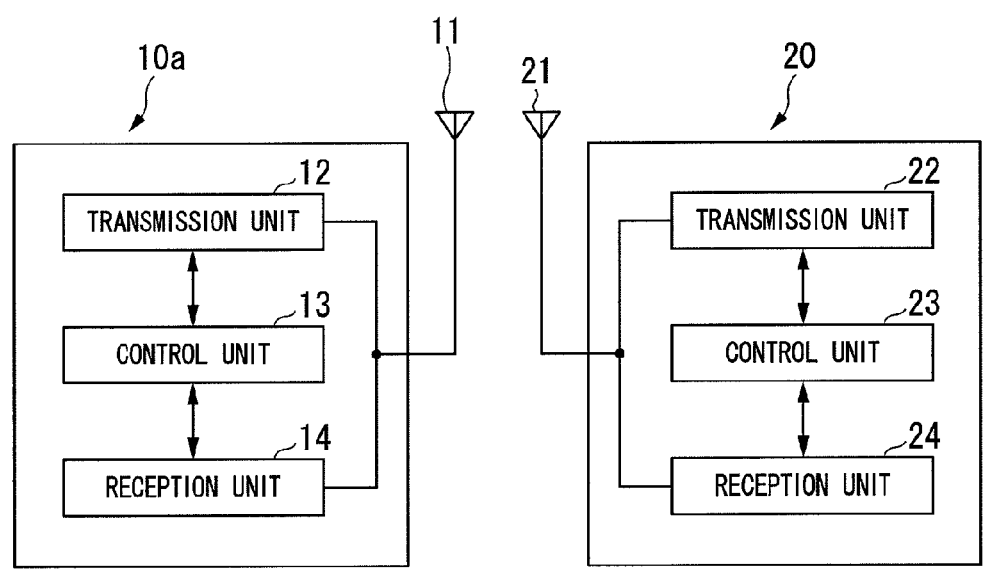
FIG. 2 is a schematic block diagram showing a configuration of a base station device 10a and a terminal 20 according to the embodiment of the present invention.

FIG. 2 is a schematic block diagram showing a configuration of the base station device 10a and the terminal 20 according to the embodiment of the present invention. Further, since the configuration of the base station device 10b (FIG. 1) is the same as that of the base station device 10a, a description thereof will be omitted.

The base station device 10a includes an antenna unit 11, a transmission unit 12, a control unit 13 and a reception unit 14.

The antenna unit 11 transmits a signal output from the transmission unit 12 to the terminal 20 as an OFDM signal in a radio frequency band. The antenna unit 11 also receives an OFDM signal in the radio frequency band transmitted from the terminal 20 and outputs the OFDM signal to the reception unit 14.

The transmission unit 12 acquires data that will be transmitted to the terminal 20, from the control unit 13, performs a transmission signal-related process, and outputs resultant data to the antenna unit 11 as an OFDM signal in a radio frequency band.

The reception unit 14 performs a reception signal-related process on the OFDM signal in a radio frequency band transmitted from the terminal 20, and outputs the processed data to the control unit 13.

The control unit 13 outputs the data that will be transmitted to the terminal 20, to the transmission unit 12, and acquires, from the reception unit 14, the data transmitted from the terminal 20. Further, the control unit 13 controls respective units of the base station device 10a.

The terminal 20 includes an antenna unit 21, a transmission unit 22, a control unit 23, and a reception unit 24.

The antenna unit 21 transmits a signal output from the transmission unit 22 to the base station device 10a as an OFDM signal in a radio frequency band. Further, the antenna unit 21 receives the OFDM signal in a radio frequency band transmitted from the base station device 10a, and outputs the OFDM signal to the reception unit 24.

The transmission unit 22 acquires data that will be transmitted to the base station device 10a, from the control unit 23, performs a transmission signal-related process, and outputs resultant data to the antenna unit 21 as the OFDM signal in a radio frequency band.

The reception unit 24 acquires the OFDM signal in a radio frequency band transmitted from the base station device 10a through the antenna unit 21, performs a reception signal-related process, and outputs a resultant signal to the control unit 23 as data.

The control unit 23 outputs data, that will be transmitted to the base station device 10a, to the transmission unit 22, and acquires data, that is transmitted from the base station device 10a, from the reception unit 24. Further, the control unit 23 controls respective units of the terminal 20.

Figure 3:
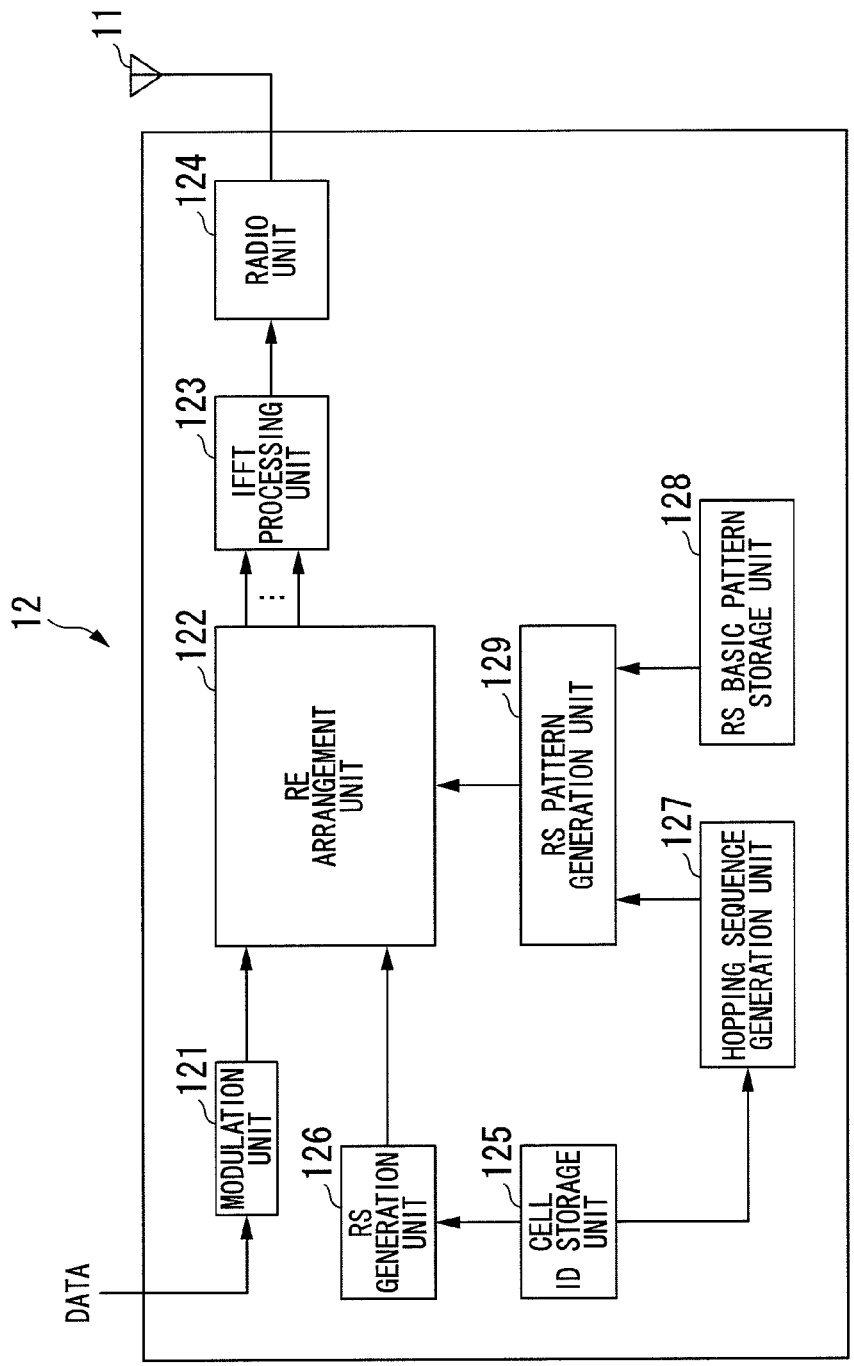
FIG. 3 is a schematic block diagram showing a configuration of a transmission unit 12 of a base station device 10a according to the embodiment of the present invention.

FIG. 3 is a schematic block diagram showing a configuration of the transmission unit 12 of the base station device 10a according to the embodiment of the present invention. The transmission unit 12 includes a modulation unit 121, an RE (resource element) arrangement unit 122, an IFFT (inverse fast Fourier transform) processing unit 123, a radio unit 124, a cell ID storage unit 125, an RS generation unit 126, a hopping sequence generation unit 127, an RS basic pattern storage unit 128, and an RS pattern generation unit 129.

First, data such as user data equivalent to information of each user and control data equivalent to a control signal are input to the modulation unit 121 from the control unit 13 (FIG. 2).

The modulation unit 121 performs modulation corresponding to each data to obtain a modulated data symbol. For example, when a communication environment is good, the modulation unit 121 modulates user data using 64 quadrature amplitude modulation (64QAM) to obtain a data symbol. The modulation unit 121 also modulates control data using quadrature phase shift keying (QPSK) to obtain a data symbol.

The data symbol modulated by the modulation unit 121 is input to the RE arrangement unit 122.

The RS generation unit 126 generates an RS equivalent to a known symbol and a pilot symbol based on a cell ID stored in the cell ID storage unit 125. The RS generated by the RS generation unit 126 is input to the RS arrangement unit 122.

The hopping sequence generation unit 127 generates a hopping sequence based on the cell ID stored in the cell ID storage unit 125. The hopping sequence generated by the hopping sequence generation unit 127 is input to the RS pattern generation unit 129.

An operation of the hopping sequence generation unit 127 will be described in detail later in <Operational method of hopping sequence generation unit>. Here, the hopping sequence generated by the hopping sequence generation unit 127 is determined based on the cell ID, and the hopping is limited.

A hopping sequence generation method and a hopping sequence limit setting method will be described in detail later in <Hopping sequence generation method>.

The RS basic pattern stored in the RS basic pattern storage unit 128 is also input to the RS pattern generation unit 129.

The RS pattern generation unit 129 performs hopping on the input RS basic pattern based on the input hopping sequence to generate the RS pattern. Here, a hopping limit is set in the hopping sequence. Therefore, the hopping limit for the RS pattern generated based on the hopping sequence is similarly set.

The operation of the RS pattern generation unit 129 will be described later in <Operation of the RS pattern generation unit>. The RS pattern generated by the RS pattern generation unit 129 is input to the RE arrangement unit 122.

The RE arrangement unit 122 arranges the modulated data signal and RS in the RE according to the RS pattern input from the RS pattern generation unit 129.

The IFFT processing unit 123 converts each signal arranged in the RE arrangement unit 122 from a signal in the frequency domain into a signal in the time domain.

The radio unit 124 converts the signal output from the IFFT processing unit 123 into a signal in a radio frequency band.

The antenna unit 11 transmits the signal output from the radio unit 124 to the terminal 20.

The hopping sequence generation unit 127 (also referred to as a first hopping sequence generation unit) of the base station devices 10a and 10b (also referred to as transmitters) of the embodiment of the present invention generates a hopping sequence in which a hopping subcarrier interval is less than or equal to a predetermined threshold value based on a cell ID.

Further, the RS pattern generation unit 129 (also referred to as a first reference signal pattern generation unit) generates an RS pattern based on an RS basic pattern consisting of a predetermined known signal sequence and a hopping sequence generated from a hopping sequence generation unit 127.

Further, the RS arrangement unit 122 (also referred to as an arrangement unit) arranges a reference signal and a data signal in a predetermined position in the symbol based on the RS pattern generated by the RS pattern generation unit 129.

Further, the radio unit 124 (also referred to as a signal transmitter) transmits the symbol having the RS and data signal arranged by the RE arrangement unit 122 to the terminal 20 (also referred to as a receiver).

Figure 4:
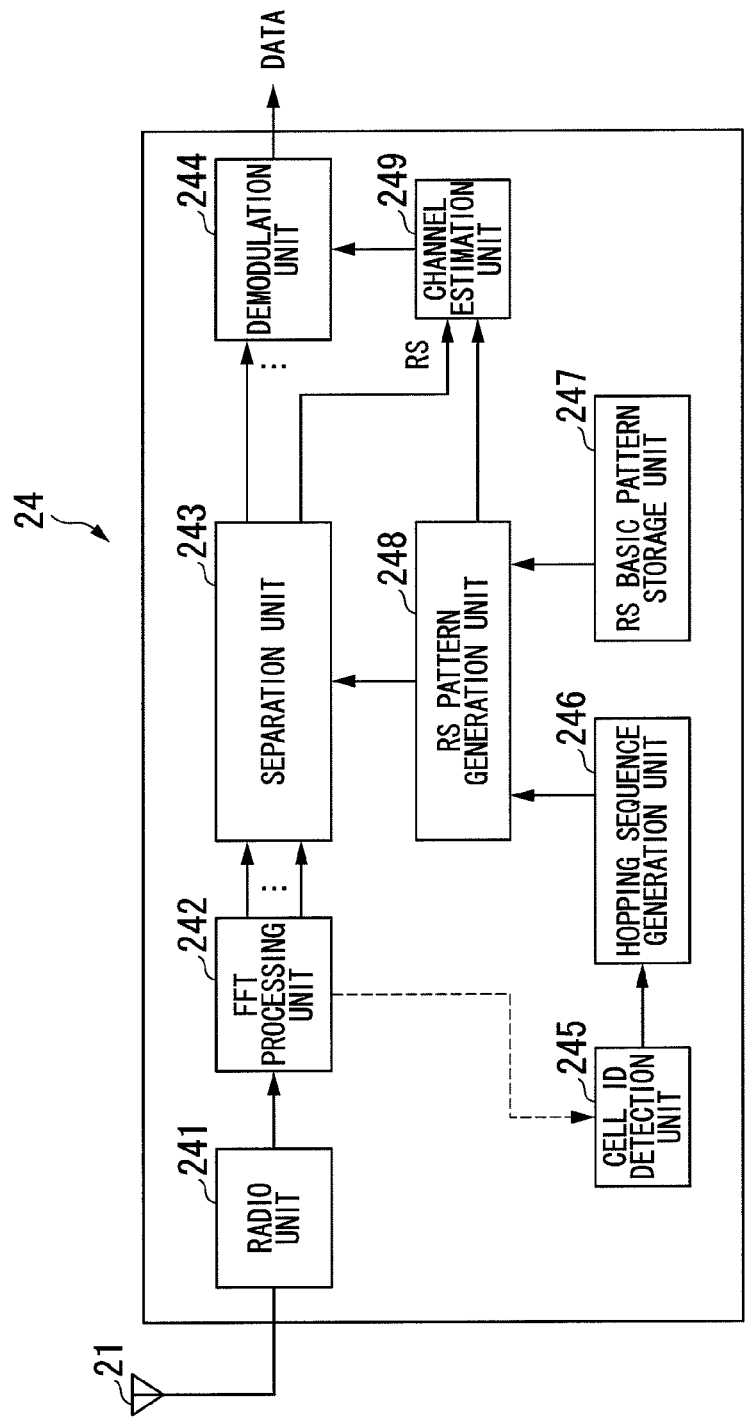
FIG. 4 is a schematic block diagram showing a configuration of a reception unit 24 of a terminal 20 according to the embodiment of the present invention.

FIG. 4 is a schematic block diagram showing a configuration of a reception unit 24 of a terminal 20 according to the embodiment of the present invention. The reception unit 24 includes a radio unit 241, an FFT (fast Fourier transform) processing unit 242, a separation unit 243, a demodulation unit 244, a cell ID detection unit 245, a hopping sequence generation unit 246, an RS basic pattern storage unit 247, an RS pattern generation unit 248, and a channel estimation unit 249.

The antenna unit 21 receives a signal in a radio frequency band transmitted from the base station devices 10a and 10b as an electrical signal. The radio unit 241 down converts the signal output from the antenna unit 21 and converts it into a base band signal.

The FFT processing unit 242 converts the signal output from the radio unit 241 from a signal in a time domain into a signal in a frequency domain, and outputs it to the separation unit 243 as a parallel signal for each subcarrier. The separation unit 243 extracts an RS and a data symbol according to the RS pattern generated in the RS pattern generation unit 248.

The process of the hopping sequence generation unit 246, the RS basic pattern storage unit 247 and the RS pattern generation unit 248 is identical to that of the hopping sequence generation unit 127, the RS basic pattern storage unit 128 and the RS pattern generation unit 129 in FIG. 3.

The cell ID detection unit 245 demodulates a signal such as a synchronization signal, and detects a cell ID.

The RS output from the separation unit 243 is input to the channel estimation unit 249.

The channel estimation unit 249 estimates a propagation channel based on the input RS and the RS pattern generated in the RS pattern generation unit 248.

The demodulation unit 244 demodulates a received data signal input to the demodulation unit 244, using a propagation channel characteristic estimated by the channel estimation unit 249.

The radio unit 241 (also referred to as a signal receiver) according to the embodiment receives a signal transmitted from the base station devices 10a and 10b.

The hopping sequence generation unit 246 (also referred to as a second hopping sequence generation unit) generates a hopping sequence based on the cell ID included in the signal received by the radio unit 241.

The RS pattern generation unit 248 (also referred to as a second RS pattern generation unit) generates an RS pattern based on an RS basic pattern consisting of a predetermined known signal sequence and a hopping sequence generated by the hopping sequence generation unit 246.

The separation unit 243 separates the reference symbol and data symbol arranged in predetermined positions of the signal received by the radio unit 241, based on the RS pattern generated by the RS pattern generation unit 248.

The channel estimation unit 249 performs channel estimation in a range in which the hopping subcarrier interval is less than or equal to a predetermined threshold value, based on the reference symbol separated by the separation unit 243.

It is possible to obtain desired data such as user data equivalent to user information and control data equivalent to a control signal through the above process.

Here, the case in which the base station devices 10a and 10b and the terminal 20 include one antenna unit is described. The base station devices 10a and 10b and the terminal 20 may include a plurality of antenna units. The RS transmission pattern transmitted from the antenna unit of each of the base station devices 10a and 10b is subjected to hopping from the RS basic pattern. For example, the same hopping may be performed with respect to all the antenna units by the hopping sequence selected based on the cell ID of each of the base station devices 10a and 10b. Further, the hopping may be performed with respect to each antenna by the hopping sequence selected based on the cell ID of each of the base station devices 10a and 10b and the number of the antenna.

<Operation Method of Hopping Sequence Generation>

Here, a method in which a hopping sequence generation unit 127 (FIG. 3) or a hopping sequence generation unit 246 (FIG. 4) determines a hopping sequence based on a cell ID will be described. Hereinafter, a first operation method and a second operation method will be described.

[First Operation Method]

In a first operation method, a hopping sequence corresponding to a cell ID is set in advance.

In this case, the base station devices 10a and 10b and the terminal 20 store a correspondence table indicating a correspondence between the cell ID and the corresponding hopping sequence in storage devices (not shown) of the hopping sequence generation units 127 and 246.

The hopping sequence generation unit 127 or the hopping sequence generation unit 246 outputs a corresponding hopping sequence based on the input cell ID using the correspondence table indicating a correspondence between the cell ID and the corresponding hopping sequence.

A method of generating the hopping sequence corresponding to the cell ID will be described later in <Method of generating a hopping sequence>.

[Second Operation Method]

In a second operation method, a hopping sequence is generated based on a cell ID and a function for generating the hopping sequence from the cell ID. The function is a hopping sequence generation function that will be described in [First generation method] of <Method of generating hopping sequence>, for example.

In this case, the base station devices 10a and 10b and the terminal 20 store the function for generating a hopping sequence in the storage devices (not shown) of the hopping sequence generation units 127 and 246. The hopping sequence generation unit 127 or the hopping sequence generation unit 246 obtains a hopping sequence from the input cell ID and the function for generating a hopping sequence and outputs the hopping sequence.

As described in the first and second operation methods, even when a different hopping sequence is used in each cell, it is not necessary to wirelessly transmit information on the hopping sequence from the base station devices 10a and 10b to the terminal 20.

This is because both the base station devices 10a and 10b and the terminal 20 store the correspondence table indicating the correspondence between the cell ID and the corresponding hopping sequence or the hopping sequence generation function and can obtain the corresponding hopping sequence using the cell ID. Therefore, it is not necessary to use the function of transmitting the hopping sequence.

<Method of Generating Hopping Sequence>

Next, a method of generating a hopping sequence will be described. It is preferable that the RS pattern of each cell is arranged as differently as possible from an RS pattern of a neighboring cell. This serves to equalize the inter-cell interference as much as possible.

Therefore, the RS pattern is set to be arranged as differently as possible from the RS pattern of the neighboring cell. Accordingly, the equalization of the inter-cell interference is attained, and the throughput characteristic of the entire system can be enhanced. Since the RS pattern is based on the hopping sequence, it is preferable that the hopping sequence is set as differently as possible from the hopping sequence of the neighboring cell.

Limiting the hopping sequence to three: −1, 0 and +1 will be described in generation methods below. An advantage of limiting the hopping sequence is described in <Investigation on complexity of channel estimation and throughput characteristic>. The hopping sequence may be limited to two: −1, +1, instead of three.

An advantage of limiting the hopping sequence to three and limiting it to two is also described in <Investigation on complexity of channel estimation and throughput characteristic>.

[First Generation Method]

In a first generation method, the hopping sequence generation function described in [Second operation method] of <Operation method of hopping sequence generation unit> is used to generate the hopping sequence. The hopping sequence generation function is used to generate the hopping sequence from the cell ID.

When the hopping sequence generation units 127 and 246 operating in [First operation method] of <Operation method of hopping sequence generation unit> are used to obtain the hopping sequence using [First generation method], the hopping sequence is obtained from the hopping sequence generation function for each cell ID and a correspondence table indicating a correspondence between the cell ID and the hopping sequence is set in advance. The base station devices 10a and 10b and the terminal 20 store the correspondence table.

When the hopping sequence generation units 127 and 246 operate in [Second operation method], the base station devices 10a and 10b and the terminal 20 store the hopping sequence generation function and calculate the hopping sequence according to the cell ID input to the hopping sequence generation units 127 and 246.

One frame consists of ten subframes in the time axis direction and one subframe consists of two sub-slots. One resource block of downlink consists of seven resource elements in the time axis direction and twelve resource elements in the frequency axis direction.

Here, the hopping sequence generation function will be described. A hopping sequence generation function using a cell ID (Cell_ID) and a subframe number (i) is defined to generate the hopping sequence. The hopping sequence generation function includes two functions as follows:

Hop1(Cell_ID)

Hop(Cell_ID,i)

The hopping sequence in each of the base station devices 10a and 10b is generated by Equation (1).

$$HP = [hp_1 \ hp_2 \ hp_3 \ hp_4 \ hp_5 \ hp_6 \ hp_7 \ hp_8 \ hp_9 \ hp_{10}] \quad (1)$$
$$= [Hop1(\text{Cell\_ID})][Hop(\text{Cell\_ID}, i)] \quad i = 2 \text{ to } 10]$$

Here, the function Hop1 (Cell_ID) determines a hopping coefficient ($hp_1$) corresponding to a first subframe from the cell ID. Here, the function Hop1 (Cell_ID) is a value ranging from −3 to +3.

The function Hop(Cell_ID, i) determines the hopping coefficients ($hp_2$, . . . , $hp_{10}$) corresponding to the 2nd subframe to the 10th subframe based on the cell IDs. Here, the function Hop(Cell_ID, i) is a value ranging from −1 to +1.

Here, only the hopping sequence corresponding to the 1st subframe is separately dealt with in consideration of the fact that the subcarrier in which the RS is arranged in each cell is set differently in advance.

$hp_1$ is an integer ranging from −3 to +3. $hp_1$ can be obtained as $hp_1$=Hop1(Cell_ID) by the function Hop1(Cell_ID) having the cell ID (Cell_ID) as its input.

$hp_2$ to $hp_{10}$ are integers having values from −1 to +1. $hp_2$ to $hp_{10}$ can be obtained as $hp_2$=Hop(Cell_ID, 2), $hp_3$=Hop(Cell_ID, 3), . . . , $hp_{10}$=Hop(Cell_ID, 10) by the cell ID (Cell_ID) and a function Hop(Cell_ID, i) having a subframe number (i) as its input.

For example, when Cell_ID=0001, $hp_1$=Hop1(0001), $hp_2$=Hop(0001, 2), hp3=Hop(0001, 3), . . . , $hp_{10}$=Hop(0001, 10).

When the hopping of the RS is performed, the RS may be arranged away from the boundary between frames.

This is due to the following reasons.

The hopping sequence is repeated for each frame (1 frame=10 subframes). Accordingly, resource elements in which reference signals of the first subframe and the 11th subframe (the first subframe of the next frame) counting from the first subframe are arranged are in the same position in the frequency direction. This position is given as $hp_1$.

Here, when the hopping is performed between −1 and +1 with no limitation, starting from the first subframe, a gap is formed in the frequency direction between the 10th subframe and the RS of the first subframe of the next frame.

When the reference signals are arranged apart in the frequency direction at the frame boundary, it is necessary to use a frame crossing filter when the terminal 20 performs the channel estimation. Accordingly, complexity of the channel estimation is increased. Further, precision of the channel estimation is also deteriorated.

In order to avoid this, it is preferable that the resource elements having reference signals arranged therein are at the same positions or in slightly different positions (not apart in the frequency direction) in the frequency direction in the frame boundary (i.e., the boundary between the last subframe of the frame and the first subframe of the next frame). Accordingly, it is possible to reduce the complexity of the channel estimation, and to enhance the estimation precision.

Considering the fact that the RS is repeatedly arranged in every 6 resource elements in the frequency direction, the following method may be used. That is, the RS may not return to its original frequency position (the frequency position of the RS of the first subframe) through hopping, but approaches a frequency position of a neighboring RS that is −6 and +6 apart in the frequency direction.

In consideration of the foregoing, it is preferable to generate a hopping sequence that satisfies the following Equation (2) in a hopping sequence generation step.

$$\left(\sum_{i=2}^{10} hp_i\right) \bmod 6 \le 1 \quad (2)$$

In Equation (2), values of the hopping performed from the 2nd subframe to the 10th subframe are summed and mod 6 is calculated. That is, when the position of the RE of the first subframe of the first frame in the frequency direction is 0, the hopping is performed from that position. In the first subframe of the second frame, the hopping is limited such that the reference signals RS come to the positions of −6, 0 and +6 in the frequency direction.

Figure 5:
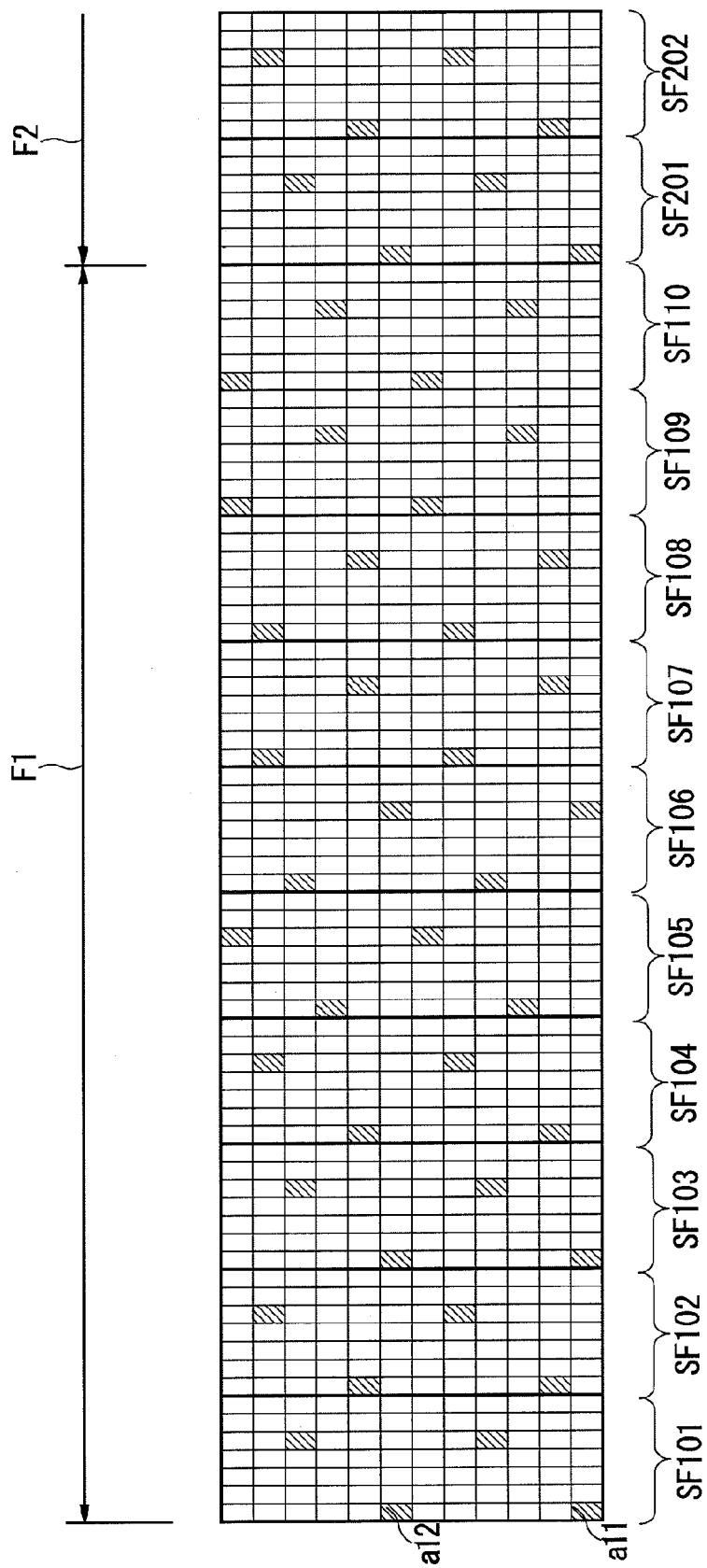
FIG. 5 is a diagram showing an example of hopping according to the embodiment of the present invention.

Here, an example of the hopping in which the limit of the Equation (2) is set is shown in FIG. 5.

FIG. 5 shows a structure of a 1st frame F1, a 2nd frame F2, . . . . The 1st frame F1 consists of a 1st subframe SF101, a 1st subframe SF102, a 1st subframe SF103, a 1st subframe SF104, a 1st subframe SF105, a 1st subframe SF106, a 1st subframe SF107, a 1st subframe SF108, a 1st subframe SF109 and a 1st subframe SF110. Further, the 2nd frame F2 consists of a 1st subframe SF201, a 2nd subframe SF202, . . . .

In FIG. 5, the reference signals are arranged in the resource elements to which the same hatching as that of the RE a11 and the RE a12 are attached.

The 2nd subframe SF102, the 3rd subframe SF103, the 4th subframe SF104, the 5th subframe SF105, the 6th subframe SF106, the 7th subframe SF107, the 8th subframe SF108, the 9th subframe SF109, the 10th subframe 110 and the 1st subframe SF201 are obtained by shifting the 1st subframe SF101, the 2nd subframe SF102, the 3rd subframe SF103, the 4th subframe SF104, the 5th subframe SF105, the 6th subframe SF106, the 7th subframe SF107, the 8th subframe SF108, the 9th subframe SF109 and the 10th subframe SF110 by +1, −1, +1, +1, +1, +1, +0, +1, +0 and +1, respectively.

Here, the RE (e.g., a11) having the RS arranged therein is converged at the position of a neighboring RS (e.g., a12) that is +6 apart in the frequency direction through the hopping.

[Second Generation Method]

In a second generation method, a hopping sequence used to equalize inter-cell interference is defined (set) at a network side in advance. The defined arrangement consists of +1, 0 and −1, for example.

When the hopping sequence generation units 127 and 246 operating in [First operation method] are used, a correspondence table indicating a correspondence between a cell ID and a hopping sequence is determined in advance. The base station devices 10a and 10b and the terminal 20 store the correspondence table in the storage devices of the hopping sequence generation unit 127 and the hopping sequence generation unit 246. The present generation method is not used in the hopping sequence generation units 127 and 246 operating in [Second operation method].

[Third Generation Method]

In a third generation method, the hopping sequence is set randomly. The hopping sequence is a random progression in which +1, 0 and −1 are randomly arranged, for example.

When the hopping sequence generation units 127 and 246 operating in [First operation method] are used, a correspondence table of the hopping sequence that is randomly arranged for each cell ID is stored in advance. The base station devices 10a and 10b and the terminal 20 store the correspondence table in the storage devices of the hopping sequence generation unit 127 and the hopping sequence generation unit 246. The present generation method is not used in the hopping sequence generation units 127 and 246 operating in [Second operation method].

<Operation of RS Pattern Generation Unit>

Here, operation of the RS pattern generation units 129 (FIG. 3) and 246 (FIG. 4) will be described.

Figure 6:
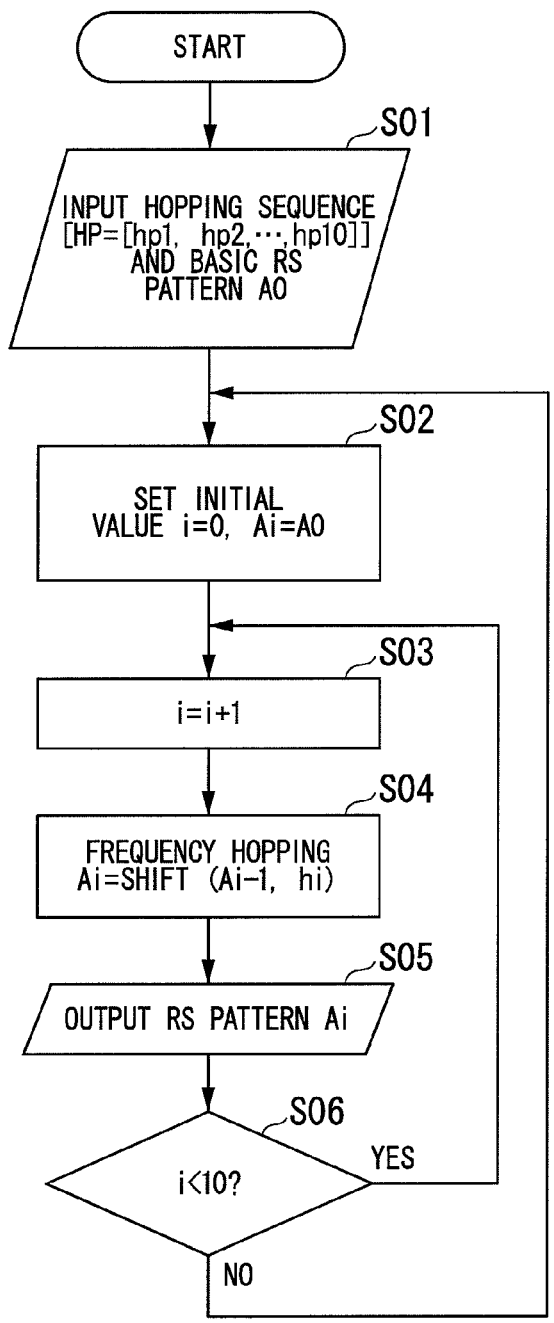
FIG. 6 is a flowchart illustrating a process of an RS pattern generation unit 129 or an RS pattern generation unit 248 according to the embodiment of the present invention.

FIG. 6 is a flowchart illustrating a process of the RS pattern generation unit 129 or the RS pattern generation unit 248 according to the embodiment of the present invention. Here, for example, the process of the RS pattern generation unit 129 will be described.

As described in FIG. 3, the hopping sequence (HP=[$hp_1$, $hp_2$, . . . , $hp_{10}$]) and the RS basic pattern (A0) are input to the RS pattern generation unit 129 (Step S01).

Here, for example, a case in which the RS pattern generation unit 129 operating in [First operation method] is used is described. That is, the base station device 10a and 10b and the terminal 20 store the correspondence table indicating a correspondence between the cell ID and the corresponding hopping sequence.

FIG. 7 is a diagram showing an example of the correspondence table indicating the correspondence between a cell ID and a hopping sequence according to the embodiment of the present invention. Here, a case in which 1 frame includes 10 subframes will be described. For example, when the cell ID is 0001, Cell_ID=0001 and a corresponding hopping sequence HP is [+3 +1 −1 −1 0 +1 0 −1 −1 +1].

The RS pattern generation unit 129 initializes a subframe number i (i=0), and sets a basic RS pattern (A0) as an initial value of an RS pattern Ai (step S02 in FIG. 6). Here, a basic RS pattern A0 is shown in FIG. 8A.

Figure 8A:
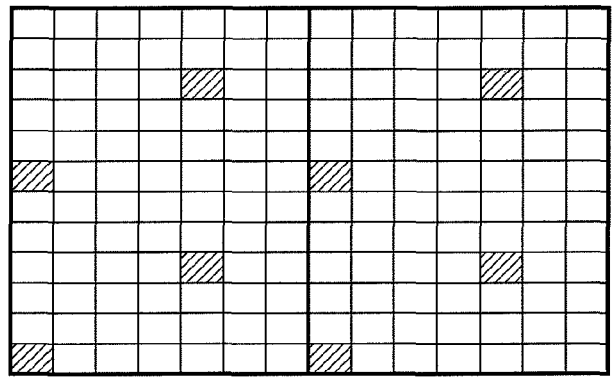
FIG. 8A is a diagram showing a basic RS pattern.

FIG. 8A is a diagram showing a basic RS pattern. In FIG. 8A, 2 resource blocks extracted from 1 subframe are shown. One resource block consists of seven resource elements in the time axis direction and twelve resource elements in the frequency axis direction. The resource elements having the RS arranged therein are shown hatched with diagonal lines.

Next, in order to perform the hopping of the RS of the first subframe, i is substituted with i+1, and i=1 (step S03 in FIG. 6).

Next, frequency hopping is performed (step S04 in FIG. 6). In the frequency hopping, the arrangement of an RS of the RS pattern Ai-1 is shifted by $hp_i$ in the frequency direction. Further, the hopping is performed using a shift function that outputs the RS pattern in which the RS arrangement is shifted, as Ai. Here, the following Equation (3) is used as the shift function.

$$Ai = \text{SHIFT}(Ai\text{-}1, hp_i) \quad (3)$$

Figure 9A:
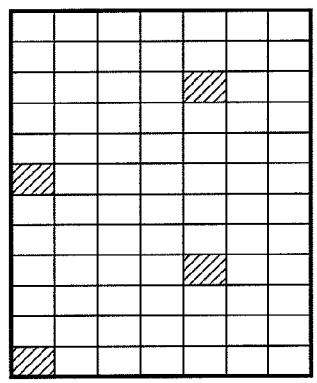
FIG. 9A is a diagram showing an RS pattern Ax-1.
Figure 9B:
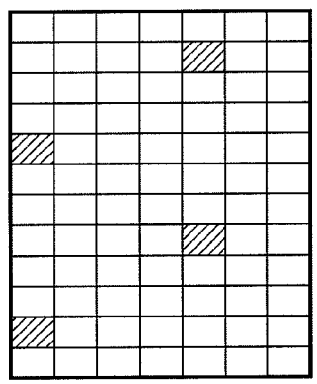
FIG. 9B is a diagram showing an RS pattern Ax.

A usage example of the shift function will be described using FIGS. 9A and 9B. FIG. 9A is a diagram showing an RS pattern Ax-1. FIG. 9B is a diagram showing an RS pattern Ax. The RS pattern Ax of FIG. 9B is obtained by shifting the RS pattern Ax-1 of FIG. 9A by +1. That is, the RS pattern Ax shown in FIG. 9B is obtained by performing an operation Ax=SHIFT (Ax-1, +1) on the RS pattern Ax-1 shown in FIG. 9A.

Figure 8B:
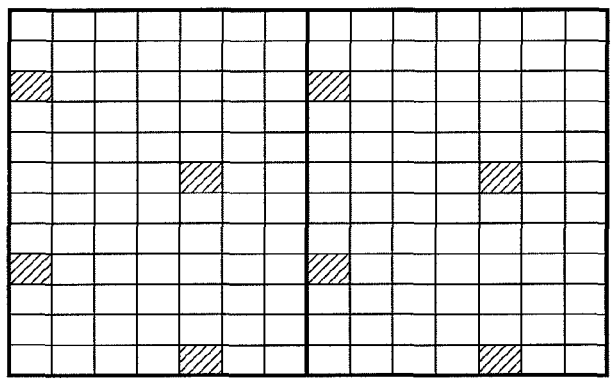
FIG. 8B is a diagram showing an RS pattern of a first subframe.

In the flowchart of FIG. 6, the RS pattern A1 in which A0 is shifted by $hp_1$ (+3) is obtained (see FIG. 8B). Further, FIG. 8B is a diagram showing an RS pattern of the first subframe. The RS pattern shown in FIG. 8B is obtained by hopping the RS pattern shown in FIG. 8A by +3 in the frequency direction.

A1 can be considered a basic RS pattern for each cell. That is, in the cell of this example, the hopping is performed in the range of ±1 in the frequency direction using the subcarrier of an RS shown in FIG. 8B as a starting point of hopping.

The obtained RS pattern is output as A1 (step S05 in FIG. 6), and input to the RE arrangement unit 122 of FIG. 3 as the RS pattern of the first subcarrier.

Next, it is determined whether i is smaller than 10 or not (step S06 of FIG. 6). When i is greater than or equal to 10, the process returns to step S02. On the other hand, when i is smaller than 10, the process returns to step S03. Accordingly, the RS pattern of the next subframe is repeatedly generated.

Here, since i=1 and i<10 is satisfied in step S06, the process returns to step S03. Further, i=2 at step S03, and the RS pattern of the second subframe is obtained at step S04.

Figure 8C:
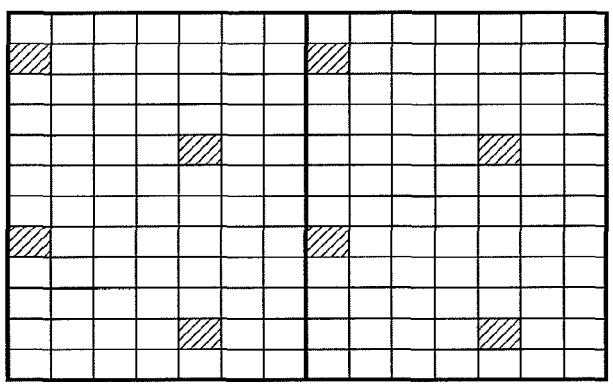
FIG. 8C is a diagram showing an RS pattern of a second subframe.

Here, because $hp_2$=+1, an arrangement obtained by shifting the RS of A1 by +1 in the frequency direction becomes an RS pattern A2 of the 2nd subframe (see FIG. 8C). FIG. 8C is a diagram showing an RS pattern of the 2nd subframe. The RS pattern shown in FIG. 8C is obtained by hopping the RS pattern shown in FIG. 8B by +1 in the frequency direction.

The RS patterns A1, ..., A10 are obtained by repeating the process described above.

While a method of re-calculating the RS pattern for each frame has been described, the present invention is not limited thereto. For example, the RS patterns A1, ..., A10 obtained in a certain frame are stored in the storage unit, and read out from the storage unit according to necessity.

<Investigation on Complexity of Channel Estimation and Throughput Characteristic>

Here, channel estimation precision and the throughput characteristic will be investigated.

FIG. 10 is a table in which complexity of channel estimation due to a difference between hopping methods and a hopping sequence number are summarized. For reference, a characteristic when the shift is performed is also described. In FIG. 10, "hopping (non-limit)" as a sequence, "2×6" as a required filter number showing complexity of channel estimation, and "$6^{10}$=60466176" as the sequence number are correspondingly stored.

Further, "hopping (limited to three: −1, 0, 1)" as the sequence, "2×3" as the complexity of channel estimation, and "$6×3^9$=118098" as the sequence number are correspondingly stored.

Further, "hopping (limited to two: −1, 1)" as the sequence, "2×2" as the complexity of channel estimation and "$6×2^9$=3072" as the sequence number are correspondingly stored.

Further, "shifting" as the sequence, "2×1" as the complexity of channel estimation, and "$6×1^9$=6" as the sequence number are correspondingly stored.

In FIG. 10, with regard to the filter number, 2D Wiener estimation (sliding-window averaging) is used as a channel estimation method. Further, the filter number, in the case where Doppler and delay spread are constant, is described.

First, complexity of channel estimation will be described. In channel estimation, as the number of filters used for estimation increases, complexity occurring during estimation increases. Accordingly, when the shift is performed, complexity of estimation is the smallest.

Next, focusing on the sequence number, as the sequence number increases, it is possible to generate a hopping sequence that averages the inter-cell interference more, and the throughput characteristic of transmission of the entire system is enhanced. Accordingly, when the hopping (non-limit) is performed, there is a possibility that the throughput is the best.

By the relation described above, throughput becomes small in the shift in which complexity of channel estimation is small. Inversely, complexity of channel estimation becomes large in the hopping (non-limit) in which throughput is large.

That is, there is a tradeoff relationship between the complexity of the channel estimation and the throughput characteristic of the system. Accordingly, it is preferable to obtain a balance between the channel estimation complexity and the throughput.

While the hopping has been limited to three: −1, 0, +1 in the above description, the hopping may be limited to two: −1, +1 to obtain the balance between the channel estimation complexity and the throughput in transmission of the entire system. When the hopping is limited to three, the throughput becomes high.

When the hopping is limited to two, the channel estimation complexity becomes small. However, when the hopping is limited to two, the available sequence number becomes 3072, which is much smaller than a sequence number 118908 when the hopping is limited to three.

Since a cell ID group number is 170, a hopping sequence number greater than or equal to 170 is sufficient. However, when considering that hopping sequences are made different, if possible, to equalize inter-cell interference, it is preferable to limit the hopping to three.

Non-Patent Document 3 discloses that hopping is limited to two, but the method of limiting the hopping sequence in Non-Patent Document 3 is to alternately repeat two hopping sequences defined in advance.

This limiting method also has an advantage that the number of filters used for estimation can be small. However, there is a problem that arrangement of reference signals is dense near certain resource elements and sparse near other certain resource elements. Accordingly, precision of the channel estimation is reduced near resource elements where the reference signals are sparse.

However, when the hopping sequence limit according to the embodiment of the present invention, that is, the limit of three: +1, 0, −1 or the limit of two: +1, −1 is used, reference signals subjected to hopping are not apart so much from each other in the frequency direction. Accordingly, the reference signals are arranged in balance throughout the arrangement, which enhances the precision of the channel estimation.

Accordingly, it is possible to limit the hopping sequence without deteriorating the channel estimation precision. The hopping may be performed in the range of +1 to −1, instead of the range of +3 to −3.

In the above-described embodiments, a program of realizing the functions of the respective units of the base station devices 10a and 10b (FIGS. 2 and 3) and the respective units of the terminal 20 (FIGS. 2 and 4) may be recorded on a computer-readable recording medium. The program recorded on the recording medium may be read and executed by the computer system to control the base station devices 10a and 10b and the terminal 20. The "computer system" mentioned herein includes an operating system (OS) or hardware such as peripheral devices.

The "computer-readable recording medium" includes a storage device, including a portable medium such as a flexible disk, a magnetic optical disk, a ROM, and a CD-ROM, and a hard disk embedded in the computer system. Further, the "computer-readable recording medium" may include a medium for temporarily and dynamically storing programs, like a communication line when a program is transmitted via a network such as the Internet or a communication line such as a telephone line, and a medium for storing programs for a predetermined time, like a volatile memory inside a computer system including a server and a client in that case. The program may be a program for realizing some of the above-described functions. Alternatively, the program may be a program capable of realizing the above-described functions through a combination with a program previously stored in a computer system.

While the embodiments of the present invention are described above with reference to the drawings, concrete configuration is not limited to the embodiments, and a design or the like whose scope is not beyond the gist of the present invention is included in the claims.

INDUSTRIAL APPLICABILITY

The present invention can be applied to a communication system, a transmitter, a receiver and a communication method capable of preventing throughput occurring when communicating using a transmitter and a receiver from being reduced.

REFERENCE SYMBOLS

10: base station device, 11: antenna unit, 12: transmission unit, 13: control unit, 14: reception unit, 20: terminal, 21: antenna unit, 22: transmission unit, 23: control unit, 24: reception unit, 121: modulation unit, 122: RE arrangement unit, 123: IFFT processing unit, 124: radio unit, 125: cell ID storage unit, 126: RS generation unit, 127: hopping sequence generation unit, 128: RS basic pattern storage unit, 129: RS pattern generation unit, 241: radio unit, 242: FFT processing unit, 243: separation unit, 244: demodulation unit, 245: cell ID detection unit, 246: hopping sequence generation unit, 247: RS basic pattern storage unit, 248: RS pattern generation unit

The invention claimed is:

1. A communication system comprising a transmitter and a receiver, wherein the transmitter comprises:
   a first hopping sequence generation unit which generates a first hopping sequence whose hopping subcarrier interval is less than or equal to 1, the generation being performed based on a cell ID;
   a first reference signal pattern generation unit which generates a first reference signal pattern, based on a basic pattern of a reference signal including a predetermined known signal sequence and the first hopping sequence generated by the first hopping sequence generation unit;
   an arrangement unit which arranges the reference signal and a data signal in a predetermined position within a signal, based on the first reference signal pattern generated by the first reference signal pattern generation unit; and
   a signal transmission unit which transmits the signal having the reference signal and the data signal arranged by the arrangement unit to the receiver, and the receiver comprises:
   a signal reception unit which receives the signal transmitted from the transmitter;
   a second hopping sequence generation unit which generates a second hopping sequence based on a cell ID included in the signal received by the signal reception unit;
   a second reference signal pattern generation unit which generates a second reference signal pattern based on the basic pattern of the reference signal including the predetermined known signal sequence and the second hopping sequence generated by the second hopping sequence generation unit;
   a separation unit which separates the reference symbol signal and the data signal arranged in a predetermined position of the signal received by the signal receiver, based on the second reference signal pattern generated by the second reference signal pattern generation unit; and
   a channel estimation unit which performs channel estimation in a range where the hopping subcarrier interval is less than or equal to 1, the channel estimation being performed based on the reference signal separated by the separation unit.

2. A transmitter communicating with a receiver, the transmitter comprising:
   a first hopping sequence generation unit which generates a hopping sequence whose hopping subcarrier interval is less than or equal to 1, the generation being performed based on a cell ID;
   a first reference signal pattern generation unit which generates a reference signal pattern based on a basic pattern of a reference signal including a predetermined known signal sequence and the hopping sequence generated by the first hopping sequence generation unit;
   an arrangement unit which arranges the reference signal and a data signal in a predetermined position within a signal, based on the reference signal pattern generated by the first reference signal pattern generation unit; and
   a signal transmission unit which transmits the signal having the reference signal and the data symbol signal arranged by the arrangement unit to the receiver,
   Wherein the receiver includes a channel estimation unit which performs channel estimation in a range where the hopping subcarrier interval is less than or equal to 1, the channel estimation being performed based on the reference signal separated by a separation unit.

3. The transmitter according to claim 2, wherein the first hopping sequence generation unit stores the hopping sequence corresponding to each cell ID in advance and generates the hopping sequence corresponding to the cell ID.

4. The transmitter according to claim 2, wherein the first hopping sequence generation unit generates the hopping sequences using a predetermined function.

5. The transmitter according to claim 3, wherein the first hopping sequence generation unit stores hopping sequences corresponding to the each cell ID in advance, a correlation therebetween being smaller than a predetermined value.

6. The transmitter according to claim 2, wherein the first hopping sequence generation unit generates a hopping sequence, a correlation therebetween being smaller than a predetermined value, corresponding to each cell ID based on the cell ID.

7. The transmitter according to claim 4, wherein the first hopping sequence generation unit generates the hopping sequence corresponding to the cell ID, a correlation therebetween being smaller than a predetermined value, using the predetermined function.

8. The transmitter according to claim 3, wherein the first hopping sequence generation unit generates the hopping sequence using a random sequence.

9. A receiver communicating with a transmitter, the receiver comprising:
    a signal reception unit which receives a signal transmitted from the transmitter;
    a hopping sequence generation unit which generates a hopping sequence based on a cell ID included in the signal received by the signal receiver;
    a reference signal pattern generation unit which generates a reference signal pattern based on a reference signal basic pattern including a predetermined known signal sequence and the hopping sequence generated by the hopping sequence generation unit;
    a separation unit which separates a reference signal and a data signal arranged in a predetermined position of the signal received by the signal receiver based on the reference signal pattern generated by the reference signal pattern generation unit; and
    a channel estimation unit which performs channel estimation in a range where a hopping subcarrier interval is less than or equal to 1, the channel estimation being performed based on the reference signal separated by the separation unit.

10. A communication method using a transmitter and a receiver, the communication method comprises:
    generating, by the transmitter, a hopping sequence whose hopping subcarrier interval is less than or equal to 1, the generation being performed based on a cell ID;
    generating, by the transmitter, a reference signal pattern, based on a reference signal basic pattern including a predetermined known signal sequence and the hopping sequence generated in the generation of the hopping sequence by the transmitter;
    arranging, by the transmitter, the reference signal and a data signal in a predetermined position within a symbol signal, based on the reference signal pattern generated in the generation of the reference signal pattern by the transmitter; and
    transmitting, by the transmitter, the signal having the reference signal and data signal arranged in the arrangement of the reference signal and the data signal, to the receiver, and
    receiving, by the receiver, the signal transmitted from the transmitter;
    generating, by the receiver, a second hopping sequence based on a cell ID included in the signal received in the reception of the signal;
    generating, by the receiver, a second reference signal pattern based on a reference signal basic pattern including a predetermined known signal sequence and the second hopping sequence generated in the generation of the hopping sequence by the receiver;
    separating, by the receiver, the reference signal and the data signal arranged in a predetermined position of the signal received in the reception of the signal, based on the second reference signal pattern generated in the generation of the reference signal pattern by the receiver; and
    performing, by the receiver, channel estimation in a range where the hopping subcarrier interval is less than or equal to 1, the channel estimation being performed based on the reference signal separated in the separation of the reference signal and the data signal.

* * * * *